Sept. 28, 1954  R. S. KRYESKE  2,690,075
APPARATUS FOR DYNAMIC BALANCING
Filed Oct. 18, 1950  5 Sheets-Sheet 1

INVENTOR.
RAYMOND S. KRYESKE
BY *Walter J Kreske*
ATTORNEY

Sept. 28, 1954 R. S. KRYESKE 2,690,075
APPARATUS FOR DYNAMIC BALANCING
Filed Oct. 18, 1950 5 Sheets-Sheet 2

INVENTOR.
RAYMOND S. KRYESKE
BY Walter J Kreske
ATTORNEY

Sept. 28, 1954  R. S. KRYESKE  2,690,075
APPARATUS FOR DYNAMIC BALANCING
Filed Oct. 18, 1950  5 Sheets-Sheet 4

INVENTOR.
RAYMOND S. KRYESKE
BY *Walter J Kreske*
ATTORNEY

Sept. 28, 1954 R. S. KRYESKE 2,690,075
APPARATUS FOR DYNAMIC BALANCING
Filed Oct. 18, 1950 5 Sheets-Sheet 5

INVENTOR.
RAYMOND S. KRYESKE
BY *Walter J. Kreske*
ATTORNEY

Patented Sept. 28, 1954

2,690,075

UNITED STATES PATENT OFFICE 2,690,075

APPARATUS FOR DYNAMIC BALANCING

Raymond S. Kryeske, Union, N. J.

Application October 18, 1950, Serial No. 190,796

12 Claims. (Cl. 73—66)

This invention relates to means for finding and correcting dynamic unbalance in rotating bodies.

In the past it has been customary to remove or add weight at selected positions on a body for dynamically balancing the body. Balancing in this manner resulted often in not only marring and defacing the body being balanced, but also generally entailed a trial and error procedure where several expensive and time consuming re-installations on the balancing machine were required. Also, machines for performing these balancing operations were relatively complicated and expensive and generally required specialized personnel having a high degree of training for performing the necessary balancing operations.

Pursuant to the present invention it has been found that the above may be overcome by a novel balancing arrangement wherein a body is dynamically balanced by relocating its center of rotation. Very important to this manner of dynamic balancing is the use of a novel machine for relocating and determining the position of the relocated center of rotation of the body being balanced. Thus this invention involves the relocation of the center of rotation for dynamically balancing a body and a novel machine used therefor.

Dynamic balancing in accordance with the present invention is accomplished generally by rotating the body about an axis free to oscillate in a single plane; indicating the projection of this plane on the body when movement in this plane occurs; and then moving the body with respect to this axis along the indicated projection until oscillations of the rotating body in this plane cease. The center of rotation of the body when the oscillations cease is the desired center of rotation for proper dynamic balance of the body.

Rotation of the body is achieved by a rotating support member to which the body is fixed. The plane of oscillation is indicated by a light source responsive to the movement of the rotating body in this plane causing at each such movement a flash of light disclosing the position of the body when the movement occurs. By providing numbered marks about the periphery of the support member, a visual indication of the exact body position at the flash of the light is obtained as an indication of the position of unbalance in the body. By stopping rotation of the body and providing a scribe aligned with the center of rotation of the body, this indicated position of unbalance may be transferred to the body as a line indicating the direction of unbalance from the center of rotation. By including in the body support member a slide permitting the body to be moved laterally with respect to the rotational axis and by aligning the above mentioned directional line with the path of this movement the center of rotation of the body becomes thereby movable in a direction for correcting the unbalance of the body.

By using the rotational axis as that of a shaft pivotally and rotatively mounted at one end, a relatively simple and inexpensive construction for confining movement of the axis in a single plane is achieved. With the pivotal mounting being about a vertical axis gravitational influences are thereby removed.

By confining the oscillatory plane movement of the other end of the shaft to that between a rigid stop and an adjustable spring, maximum unbalance sensitivity is achieved as well as versatility for operation at a wide variety of selected rotational test speeds.

By making the shaft tubular and providing therein an adjusting rod at one end engaging guides on the body support slide structure and at the other end controlled by a stationary adjusting member, movement of the rotational axis of the body under test may be achieved while the body is in rotation.

These and other features, objects and advantages of the invention will become more apparent in the following description taken in connection with the accompanying drawings illustrating one exemplary embodiment of the invention wherein.

Figure 4:
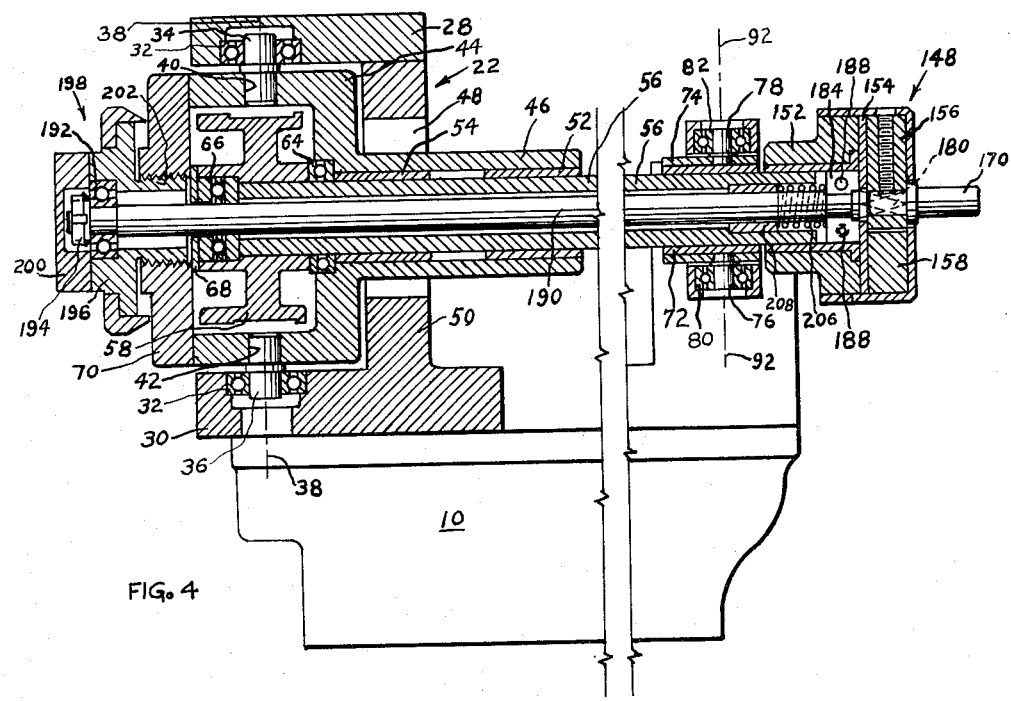
Fig. 4 is a cross sectional view of a portion of the machine taken as on line 4—4 of Fig. 1 and drawn to a larger scale.

Referring to the drawings in more detail, the exemplary device has a base 10 mounted on resilient rubber cushions 12 and held in place by screws 14 to the top of a rigid table 16. Fixed to one end of the top of base 10 as by screw 18 and dowels 20 is a bracket 22. The bracket 22 has fixed thereon by screws and dowels 24 and 26 respectively (Fig. 1) a horizontally disposed top member 28 which together with the horizontal base member 30 house a pair of ball bearing sets 32 (Fig. 4) each retaining one end of a pivot 34 and 36 respectively axially aligned to rotate about a vertical axis 38 (Fig. 4). The ball bearing sets 32 are preferably of the pre-loaded type to minimise undesirable mechanical play or looseness under operating conditions.

Figure 2:
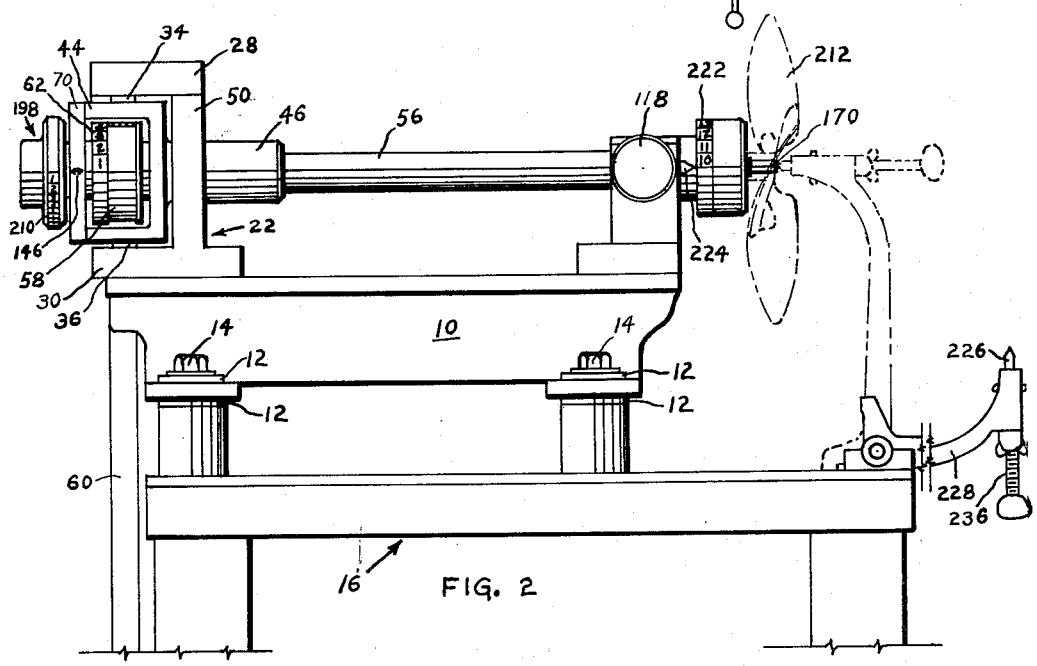
Fig. 2 is a front elevation of part of the machine with a body to be balanced shown mounted thereon.
Figure 3:
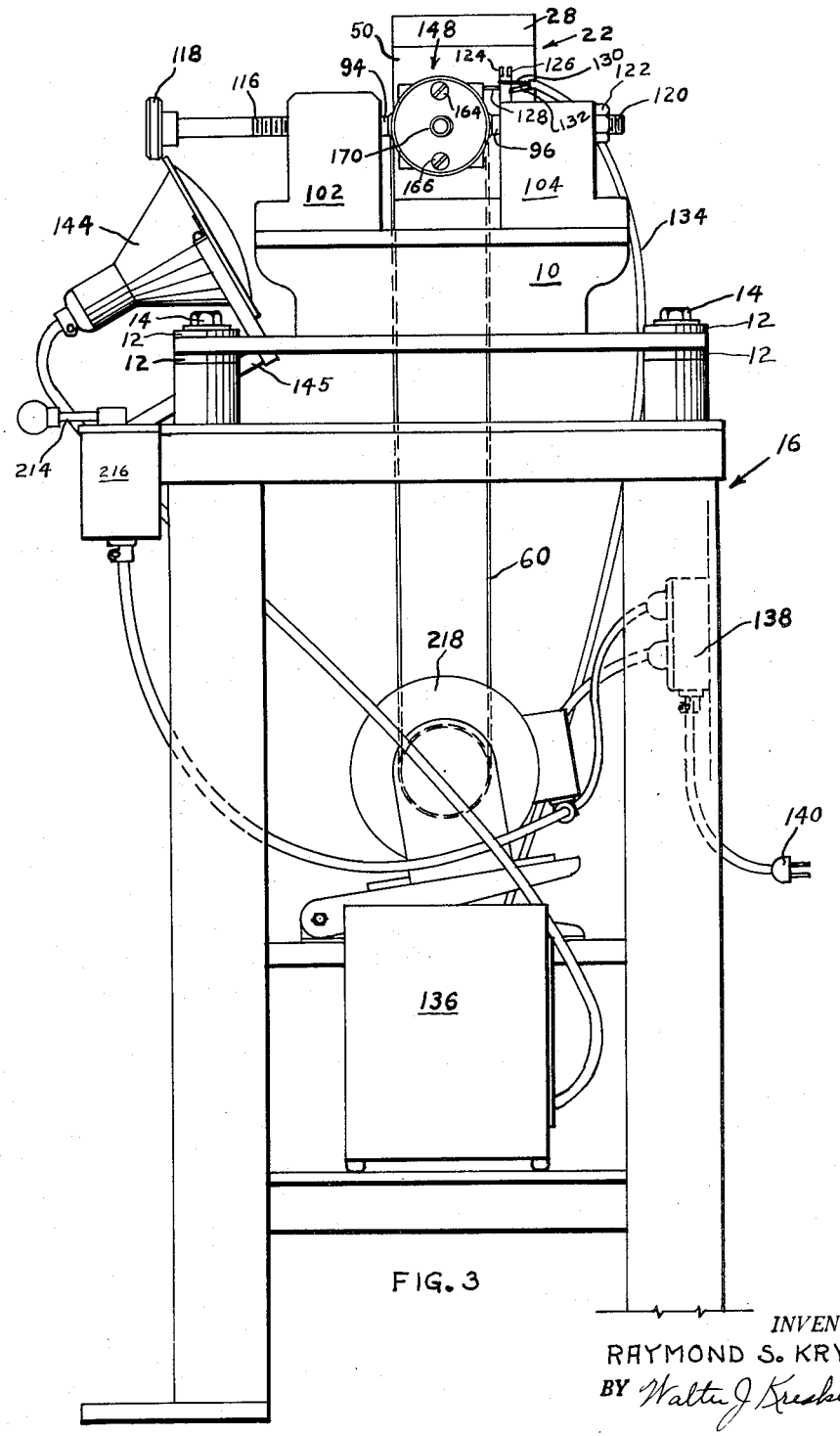
Fig. 3 is a side elevation of the machine.

The other end of each of pivots 34 and 36 are tightly fitted in oppositely disposed holes 40 and 42 respectively in a yoke 44. The yoke 44 has a horizontally projecting tubular housing 46 projecting through a large opening 48 in a vertical wall 50 of the bracket 22. Two journal bearings 52 and 54 in the tubular housing 46 rotatively mount therein a hollow cylindrical shaft 56. The end of the shaft 56 protruding in the yoke 44 has rigidly fixed thereto as by a set screw or key (not shown) a pulley 58 for a belt 60 (Figs. 2, 3). The pulley 58 is preferably mounted with the centerline 38 of pivots 34 and 36 falling at the center of the width of belt 60 and the belt 60 is directed downward to prevent any force exerted on the pulley by the belt from creating a turning moment about the vertical axis 38.

Calibrations or markings 62 (Fig. 2) are provided about one side of the peripheral face of pulley 58 for reasons as will be hereinafter described.

To prevent axial movement of shaft 56 the pulley 58 is mounted between a thrust bearing 64 (Fig. 4) fitted against one end of the tubular housing 46, and a thrust bearing 66 fitted through a washer 68 against a yoke cap 70 fixed to the end of yoke 44 as by screws (not shown).

Figure 5:
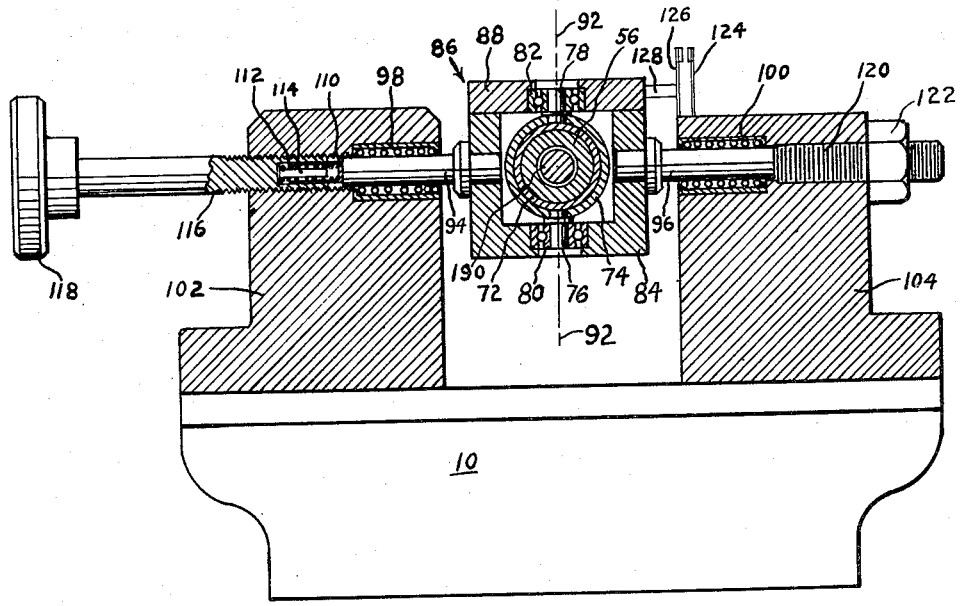
Fig. 5 is a cross sectional view of a portion of the machine taken as on line 5—5 of Fig. 1 also drawn to a larger scale.

Near its other end the shaft 56 is journaled to rotate and slide in a bearing 72 fixed in a sleeve 74 (Figs 4, 5). The sleeve 74 has tightly fitted in oppositely disposed holes therein, pivots 76 and 78, the other ends of which are held in ball bearing sets 80 and 82 respectively. The ball bearing set 80 is mounted in a U-shaped body portion 84 of a box type yoke 86 and the ball bearing set 82 is mounted in a cap 88 of the box type yoke 86 and fixed to the body portion 84 as by screws and dowels 90 (Fig. 1), thereby providing freedom of movement of shaft 56 with respect to yoke 86 about a vertical axis 92.

Arbors 94 and 96 (Figs. 2, 3, 5) are tightly fitted at one of each of their ends in holes in the sides of the U-shaped body 84 of the box type yoke 86 preferably with the axes of the arbors 94 and 96 horizontally aligned in perpendicular relation to the vertical axis 38 about which shaft 56 is pivotally mounted. Each of the other ends of arbors 94 and 96 is mounted to ride freely in ball bushings 98 and 100 (Fig. 5) respectively housed in support blocks 102 and 104 respectively which are rigidly fixed as by screws 106 and located by dowels 108 (Fig. 1) to the top of the base 10. The arbor 94 abuts through a cylindrical container 110 (Fig. 5) against a coil spring 112 wound about a guide rod 114. The cylindrical container 110 is slidably arranged in a recess in one end of a threaded stem 116 fitted in a threaded hole in the block 102 and aligned with the axis of arbor 94. By turning the knob 118 in one or the other direction the pressure of the coil spring 112 against the end of arbor 94 may be increased or decreased to produce a reaction as will be hereinafter described.

Figure 1:
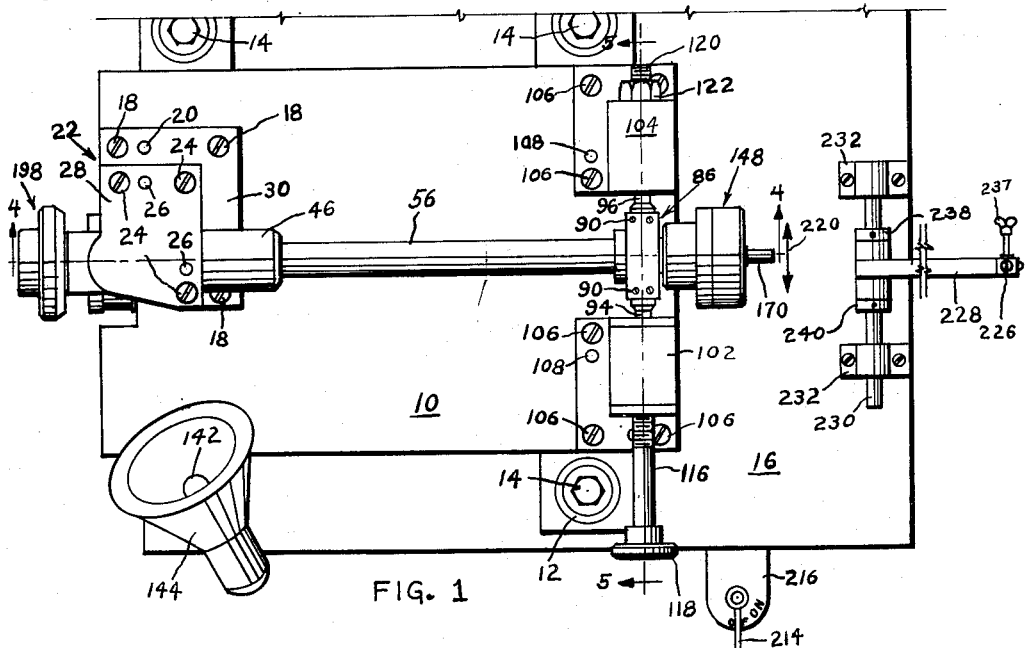
Fig. 1 is a plan view of a dynamic balancing machine.

The horizontal pivotal movement of shaft 56 in the direction of the block 104 is limited by the abutting of arbor 96 against the end of adjustable set screw 120 screwed into block 104 and locked in a place by a nut 122 (Figs. 1, 3, 5). Arbor 96 and set screw 120 are preferably made of a material having low vibration damping properties such as hardened steel. Electrical switch contacts or prongs 124 and 126 are fixed to the top of the block 104 with the prong 126 actuated by an actuator pin 128 (Figs. 3, 5) fixed to the side of yoke 86 so as to cause the prong 126 to move toward prong 124 with yoke 86 in response to movement of shaft 56 toward block 104 about its pivotal axis 38 (Fig. 4). The prong 124 is so positioned that when the shaft 56 is displaced from a selected zero position, as that shown in Fig. 5 by the centerline 92, in the direction of the block 104 by a very small amount the prongs 124 and 126 make electrical contact with each other to close a circuit formed by electric lines 130 and 132 (Fig. 3) coupled to the prongs 124 and 126 respectively. The prong 124 and set screw 120 are preferably adjusted so that the closed circuit occurs at the extreme end of the displacement of shaft 56 permitted by the set screw 120.

Wires 130 and 132 are lead through a cable 134 (Fig. 3) to a conventional stroboscopic mechanism 136 connected through a plug fixture 138 and electrical plug 140 to a suitable power source (not shown). When the circuit is closed as explained above it causes the mechanism 136 to pulse a Strobotron 142 (Fig. 1) thereby causing a momentary flash of light. The Strobotron 142 is held in a light housing 144 fixed to table 16 by a bracket 146 (Fig. 3) in such position as to direct the flash of light onto the calibrations 62 on the pully 58, thereby effecting, in conjunction with reference marks 146 on yoke cap 70, an indication of the exact angular position of the shaft 56 when the flash from the Strobotron 142 occurred.

Figure 6:
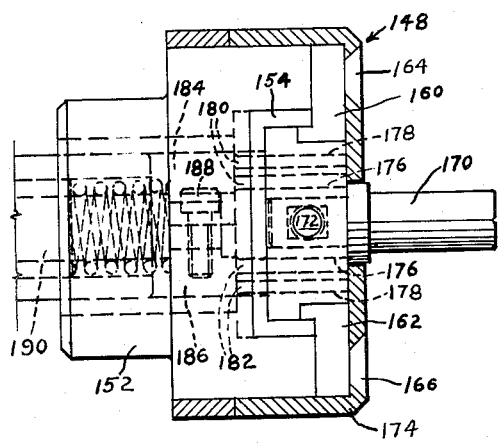
Fig. 6 is a side view of the workhead of the machine with the housing cut away as on line 6—6 of Fig. 7.
Figure 7:
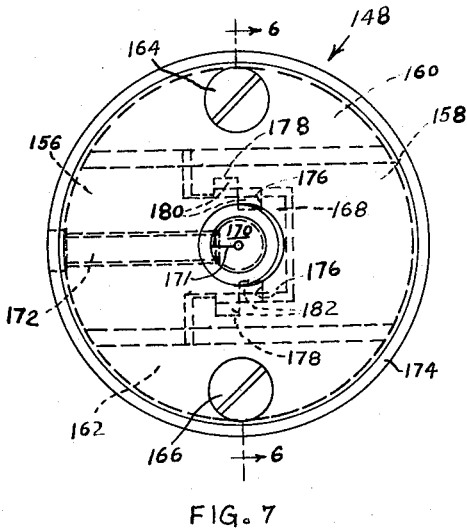
Fig. 7 is a front view of the workhead.
Figure 8:
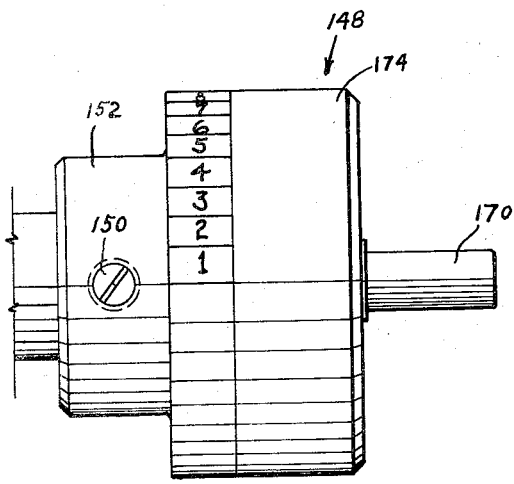
Fig. 8 is a side elevation illustrating the exterior appearance of the workhead as a whole.

The end of the shaft 56 just in front of the yoke 86 has mounted thereon a workhead 148 which is rigidly held in place as by a set screw 150 (Fig. 3) in its body portion 152 so as to rotate integrally with the shaft 56. The workhead 148 has an elongated trough shaped guide member 154 (Figs. 4, 6) fitted in a slot across the face of the body portion 152. Slidably fitted in the trough shaped guide member 154 are two oppositely disposed slides 156 and 158 (Figs. 4, 7, 9) constrained to slide longitudinally of the trough 154 by two gibs 160 and 162 on either side of the slides 156 and 158 and fixed to the body portion 152 by screws 164 and 166 respectively (Figs. 6, 7). The slide 158 is recessed to receive a projection 168 of slide 156 having a hole in which is rigidly fixed one end of a work mounting spindle 170. The work-mounting spindle 170 has a line 171 (Fig. 7) marked on its face indicating the direction of movement of the spindle 170 with slides 156 and 158. A set screw 172 is used to securely fasten the work-mounting spindle to slide 156.

The slides 156 and 158 when extended in opposite directions outwardly abut against the inside surface of a housing 174 forming the front covering portion of the workhead 148 and held by screws 164 and 166. The slides 156 and 158 are so dimensioned that in this extreme extended position the work mounting spindle 170 which moves integrally with the slide 156 is in exact axial alignment with the shaft 56.

The slide 156 is provided at the sides of its projection 168 with parallel grooves 176 (Figs. 6, 7, 9) angularly disposed with respect to the the axis of the shaft 56. Likewise the sides of the recessed portion of slide 158 are provided with parallel grooves 178 angularly disposed with respect to the axis of the shaft 56. The angles of grooves 176 and 178 with respect to the axis of the shaft 56 are equal and opposite. Fitted in these grooves are two X-shaped guide members 180 and 182 (Figs. 6, 7, 9), each being at one of their ends constructed integral with a cylindrical flange half-section 184 (Figs. 4, 6, 9) and 186 (Fig. 6) respectively. The flange half-sections 184 and 186 are fastened together by screws 188 so as to engage a nicked portion near one end of a spindle adjusting rod 190 (Figs. 4, 5, 6, 9) which extends axially inside the tubular shaft 56 and protrudes at its other end beyond the pulley 58 where it is supported in a ball bearing set 192. The inner race of the ball bearing set 192 is fixed securely between a shoulder near the end of rod 190 and a nut and washer 194 on the threaded end of rod 190.

The outer race of the ball bearing set 192 is fastened against a shoulder in the body portion 196 (Fig. 4) of an adjusting knob 198 by a cap 200 fixed to the body portion 196 as by screws (not shown). The body portion 196 of the knob 198 has a screw extension 202 screwed into a threaded hole in the cap 70 on the end of yoke 44. While the rod 190 normally rotates with the shaft 56 and workhead 148, the knob remains stationary. By rotating the knob 198 it may be moved inwardly toward or outwardly away from the yoke cap 70 by an amount determined by the amount and direction of the rotation and the lead of the threads of the screw extension 202. This axial movement of the knob is directly transmitted through the ball bearing set 192 to the rod 190 causing it and thereby the flange sections 184 and 186 with their respective attached X-shaped guide members 180 and 182 to move axially by an equal amount. A coil spring 206 (Fig. 4) compressed between the flange sections 184 and 186 and bushing 208 resting against a shoulder in the tubular shaft 56 maintains a continuous pressure against the flange sections 184 and 186 which prevents backlash problems in axial movement of the adjusting rod 190 and X-shaped guide members 180 and 182.

Figure 9:
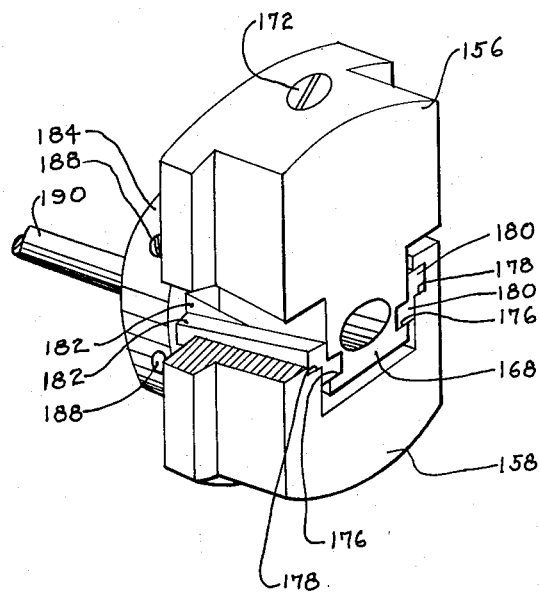
Fig. 9 is a partly sectioned isometric view of some of the workhead elements to more clearly show their construction and operation.

To more clearly illustrate the operation and construction of the slides 156 and 158 in cooperation with the X-shaped guide members 180 and 182, an isometric drawing in an enlarged scale has been presented in Fig. 9. For purposes of clarity, Fig. 9 shows only such essential elements of the workhead 148 as the slides 156 and 158, the X-shaped guide members 180 and 182, the cylindrical flange half section 184 and the forward end of spindle adjusting rod 190. These elements are shown in Fig. 9 in the proper operating relation to each other. A portion of slide 158 is cut away to show construction of the X-shaped guide members.

Movement of the X-shaped guide members 180 and 182 in the direction of the yoke 86 causes the slides 156 and 158 to move inwardly by equal distances from their extreme extended initial positions in the workhead 148, thus carrying the work-mounting spindle 170 out of axial alignment with the shaft 56 by an amount equal to the movement of the slide 156. The slides 156 and 158 and spindle 170 are constructed with a weight distribution to maintain perfect dynamic balance despite this movement. The periphery of the adjusting knob 198 is calibrated to read at reference mark 146 directly the amount by which the spindle 170 is displaced from its aligned position. In the present instance the calibrations read in thousandths of an inch and are illustrated at 210 (Fig. 2).

In operation, a body to be dynamically balanced, such as a fan, may have a hole the diameter of work-mounting spindle 170 formed as nearly in the center of its hub as is consistent with normal production procedure. The fan is then mounted by this hole upon the spindle 170 as illustrated by the dotted lines 212 (Fig. 2). A set screw (not shown) may be used in the hub of the fan 212 to fix it firmly to the mounting spindle 170 so that it will rotate integrally with the spindle. The zero calibration mark on knob 198 is brought opposite mark 146 (Fig. 2) so as to place the spindle 170 in axial alignment with the axis of the shaft 56. Handle 214 of switch 216 (Figs. 1, 3) is moved to the "on" position thereby causing rotation of shaft 56 driven through the pulley 58 by the belt 60 from a motor 218 (Fig. 3) connected to a suitable power source (not shown) through plug 140. The rotational speed of shaft 56 is preferably maintained at the speed at which the fan 212 will normally operate. In this instance 2200 revolutions per minute was the speed used but other speeds may also be found suitable. It should be noted here that dynamic balancing machines heretofore used have generally been required to operate at speeds below the normal operating speed of the body and thereby have not been truly indicative of operating unbalance characteristics of the body.

Any unbalance in the fan 212 will appear as an oscillation of the rotating shaft 56 and workhead 148 in a single plane about the vertical axis 38. The workhead 148 and spindle 170 will thereby be caused to move in a forward and a reverse direction indicated by the double head arrow 220 (Fig. 1). The oscillation will be in a horizontal plane defined by the axis of the shaft 56. By turning knob 118 the spring 112 is adjusted to produce peak unbalance oscillations for the particular rotational speed and unbalance conditions of the fan, thereby creating a maximum sensitivity condition of the mechanism to the unbalance in the fan. This is particularly important in cases where the body under test is light or the amount of unbalance is small or where the particular unbalance conditions are not conducive to produce oscillations at the selected rotational test speed. It is also important in making the machine adaptable to effective and accurate operation for other selected rotational test speeds.

Oscillation displacements in the direction of block 102 cause momentary illuminations of the calibrations 62 on pulley 58 by the Strobotron 142 as explained above. The figure seen as standing still aligned with the reference mark 146 during these momentary illuminations is then read and noted. This figure identifies the direction from the axis of rotation of the shaft of the unbalance in the fan. When this direction figure has been obtained, the switch handle 214 is then turned to the "off" position to stop rotation of shaft 56. The shaft 56 is then turned by hand until the same number in calibrations 222 (Fig. 2) on the periphery of the workhead as obtained from the pulley 58 is aligned with the reference pointer 224 fixed to block 102.

Then lever 228 which is adjustably and pivotally mounted on rod 230 between collars 238 and 240 in brackets 232, fixed to the top of table 16, and normally in a horizontal position is raised (as shown by the broken lines in Fig. 2) to a verticle position with such force that a punch 226 housed in the lever 228 and having a sharp face in the form of a line, causes thereby a mark in the form of a line on the face of the hub of fan 212. The punch 226 which is adjustable by a thumb screw and lock nut arrangement 236 and held in place by thumb screw 237 is positioned so that the above mentioned line mark occurs in a horizontal plane running through the axis of the work-mounting spindle 170. This line indicates the direction from the fan axis of the unbalance of the fan.

The line on the hub of fan 212 is then aligned with the line 171 on the end of the work-mounting spindle 170. This may normally be done by holding the shaft 56 with one hand and forcing the fan about the spindle 170 with the other hand until the two marks are in line. Since the spindle 170 is preferably made of hardened and ground steel, even pressure and surface contact from set screws in the hub of the fan 212 will not mar its surface by this method of alignment.

With the two lines (171 and that scribed on the hub) in alignment, the shaft 56 with workhead 148 and fan 212 are again put in rotation by moving the switch handle 214 to the "on" position. During rotation of the fan 212, adjusting knob 198 is rotated until the Strobotron 142 stops flashing. When the Strobotron 142 stops flashing it indicates that oscillations due to unbalance of the fan have ceased because the spindle 170 has been moved to thereby create a new center of rotation about which the fan is in proper dynamic balance.

The amount by which the spindle 170 has been displaced and therefor the location of the new proper center of rotation may be read directly from the calibrations on the adjusting knob 210. This new center of rotation will lie directly in line with the line marked by the punch 226 on the face of the hub of fan 212. The hub of fan 212 may with the above information be rebored for the new center of rotation by a relatively simple and conventional machining operation or by the insertion in the existing hole of a bushing having an offset hole therein aligned with the new center of rotation.

While in the present instance a fan was used for illustrative purposes as the body to be balanced, other bodies, preferably of the type having a small axial dimension as compared to rotational diameter such as disks, rotors and the like, may be similarly balanced with a high degree of accuracy and speed.

This invention is not limited to the particular details of construction or processes herein described as equivalents will suggest themselves to those skilled in the art.

What I claim is:

1. A dynamic balancing machine of the character described comprising an elongated horizontal member rotatively and pivotally mounted at one end, said pivotal mounting disposed to permit oscillation of the other end of said member in a horizontal plane about the axis of said pivotal mounting, rigid stop means restricting the amplitude of said oscillation in one direction, adjustable spring means in the path of said oscillation in the other direction, laterally movable means fixed to the other end of said member for mounting said body, said laterally movable means disposed to move said body laterally with respect to the axis of said horizontal member, means in driving engagement with said horizontal member for rotating said horizontal member and thereby said body about said axis and causing thereby oscillations about said pivotal mounting due to unbalance of said body, means in responsive relation to said oscillations for indicating the direction from said axis of the unbalance of said body, adjusting means coupled to said laterally movable means for moving said body during said rotation about said axis, thereby providing means for causing said oscillations to cease when said direction of unbalance is aligned with the path of said movement.

2. In a dynamic balancing machine, an elongated hollow shaft rotatively and pivotally mounted at one end, a housing fixed to the other end of said shaft, slide members in said housing and disposed to move radially with respect to the axis of said hollow shaft, mounting means for a body to be balanced fixed to one of said slide members, guides disposed to move axially of said hollow shaft and slidably engaging said slide members at small oppositely disposed angles with the axis of said hollow shaft to thereby cause said slide members to move radially in proportional relation to axial movement of said guides, an elongated member in the hollow of said shaft at one end movably engaging said guides, and adjusting means at the other end of said shaft for moving said shaft axially by selected increments, thereby moving said body radially in corresponding increments.

3. In a dynamic balancing machine, an elongated hollow shaft rotatively and pivotally mounted at one end, a housing fixed to the other end of said shaft, slide members in said housing and disposed to move radially with respect to the axis of said hollow shaft, mounting means for a body to be balanced fixed to one of said slide members, guides disposed to move axially of said hollow shaft and slidably engaging said slide members at small oppositely disposed angles with the axis of said hollow shaft to thereby cause said slide members to move radially in proportional relation to axial movement of said guides, an elongated member in the hollow of said shaft at one end fixed to said guides to transmit axial motion thereto, a control member at the other end of said shaft, said control member being axially adjustable and having said elongated member rotatively mounted therein and axially movable with said control member, thereby providing means for moving said body radially during said rotation.

4. A dynamic balancing machine of the character described comprising means for mounting a body to be dynamically balanced, means for supporting said mounting means for rotation about an axis, means for mounting said support means for oscillation in substantially a single plane, means in responsive relation to said support means during said oscillations for indicating the direction from said axis of the unbalance of said body, said body mounting means including an adapter, said adapter including a slide movable in transverse relation to said axis, and means for fastening said body to said slide as a sole support for said body thereby providing means for moving said body with respect to said axis along a path determined by said indicated direction for thereby causing said oscillations to cease.

5. A dynamic balancing machine of the character described comprising means for mounting a body to be dynamically balanced, means for supporting said mounting means for rotation about an axis, means for mounting said support means for oscillation in substantially a single plane, means in responsive relation to said support means during said oscillations for indicating the direction from said axis of the unbalance of said body, said body mounting means including an adapter, said adapter including a slide movable in transverse relation to said axis, and means for fastening said body to said slide as the sole support for said body, thereby providing means for moving said body with respect to said axis along a path determined by said indicated direction for thereby causing said oscillations to cease, and means cooperating with said last mentioned means indicating the extent of said movement.

6. A dynamic balancing machine of the character described comprising means for mounting a body to be dynamically balanced, means for supporting said mounting means for rotation about an axis, means for mounting said support means for oscillation in substantially a single plane, light means adapted to momentarily illuminate said support means at a selected displacement position of said axis from a reference position in said plane, thereby indicating the direction from said axis of the unbalance of said body, said body mounting means including an adapter, said adapter including a slide movable in transverse relation to said axis and means for fastening said body to said slide as the sole support for said body, thereby providing means for moving said body with respect to said axis in said indicated direction and causing said oscillations to cease.

7. A dynamic balancing machine of the character described comprising means for mounting a body to be dynamically balanced, means for supporting said mounting means for rotation about an axis, means for mounting said support means for oscillation in substantially a single plane, adjustable spring means cooperating with said support means during the oscillatory movement in one direction in said plane for controlling unbalance oscillations in said plane, means responsive to displacement of said support means in the other direction in said plane for momentarily illuminating said rotating means, thereby indicating the direction from said axis of the unbalance of said body, said body mounting means including an adapter, said adapter including a slide movable in transverse relation to said axis and means for fastening said body to said slide as the sole support for said body, thereby providing means for moving said body and axis with respect to each other along a path determined by said indicated direction of unbalance for thereby causing said oscillations to cease.

8. A dynamic balancing machine of the character described comprising a support member for a body to be balanced, means for rotatively and pivotally mounting said support member, means laterally movable in a single path fixed to one end of said member for mounting said body to rotate integrally with said support member, means for rotating said member about its axis and causing thereby oscillations due to unbalance of said body, light means in responsive relation to the oscillatory motion of said support member for indicating the direction from said axis of the unbalance of said body, adjusting means in control relation to said laterally movable means for moving said laterally movable means and thereby said body with respect to said axis to stop said oscillations, means cooperating with said last mentioned means for indicating the extent of said movement and stop means cooperating with said support member limiting lateral movement in said plane.

9. A dynamic balancing machine of the character described comprising a spindle for mounting a body to be balanced, a shaft, means for pivotally and rotatively mounting said shaft, slide means fixing said spindle to one end of and to rotate integrally with said shaft, said slide means including members disposed to slide in opposed directions, one of said members carrying said spindle for movement in a single path laterally with respect to the axis of said shaft, said members cooperating to maintain continuous dynamic balance, means for rotating said shaft and thereby said spindle and body about said axis and causing thereby oscillations due to unbalance of said body, means in responsive relation to said oscillations of said shaft for indicating the direction from said axis of the unbalance of said body, means in control relation to said slide means for causing said slide means and thereby said spindle and body to move along said path and stop means cooperating with said mounting means limiting lateral movement in said plane.

10. A dynamic balancing machine of the character described comprising a spindle for mounting a body to be balanced, a shaft pivotally and rotatively mounted at one end, slide means fixing said spindle to the other end of said shaft, said slide means including members disposed to slide in opposed directions, one of said members carrying said spindle for movement in a single path laterally with respect to the axis of said shaft, said members cooperating to maintain continuous dynamic balance, means for rotating said shaft about its axis and causing thereby oscillations about said pivotal mounting due to unbalance of said body, adjustable spring means fixed in the path of and in a position to be flexed by said oscillating shaft, means responsive to the oscillations of said shaft for indicating the direction from said axis of the unbalance of said body, marking means, means movably mounting and constraining movement of said marking means to mark a preselected radial plane on said body, and adjusting means coupled to said slide means for moving said slide means and thereby said spindle and body in said lateral direction during said rotation, thereby permitting adjustment for causing said oscillations to cease when said direction of unbalance is aligned with the path of said movement.

11. A dynamic balancing machine of the character described comprising an elongated horizontal member, means for rotatively and pivotally mounting said member, said pivotal mounting disposed to permit oscillation of one end of said member in a horizontal plane about the axis of said pivotal mounting, a housing fixed to said one end in axial alignment with said rotative member, radially disposed slide members in said housing, mounting means for a body to be balanced fixed to one of said slide members, said slide members disposed to slide in opposed directions and adapted to both move said mounting means laterally with respect to the axis of said elongated horizontal member and maintain continuous, dynamic balance, means for rotating said horizontal member about its axis and causing thereby oscillations due to unbalance of said body, means responsive to the oscillations of said horizontal member for indicating the direction from said axis of the unbalance of said body, stop means cooperating with said elongated member limiting lateral movement in said plane, and adjusting means coupled to said slide members for moving said mounting means during said rotation about said axis, thereby providing means for causing said oscillations to cease when said direction of unbalance is aligned with the path of said movement.

12. In a dynamic balancing machine, the combination of an elongated member for supporting a body to be dynamically balanced, means for rotatively mounting said member, means for pivotally mounting said rotative means and thereby constraining translatory movement of said elongated member in a single plane in one and the opposite directions about the axis of said pivotal mounting, a rigid stop member limiting movement of said elongated member in said one direction about said axis, adjustable spring means disposed to exert upon said elongated member a force increasing with displacement of said elongated member in said opposite direction and directed to move said elongated member toward said stop member; means for indicating the position of unbalance, and means for actuating said indicating means in response to movement of said elongated member in said one direction.

References Cited in the file of this patent

UNITED STATES PATENTS

| Number | Name | Date |
|---|---|---|
| 1,486,115 | Allen | Mar. 11, 1924 |
| 1,761,945 | Van Degrift | June 30, 1930 |
| 1,867,413 | Lee | July 12, 1932 |
| 2,140,398 | Buckingham | Dec. 13, 1938 |
| 2,196,031 | Schildmeier | Apr. 2, 1940 |
| 2,219,795 | Van Degrift | Oct. 29, 1940 |
| 2,315,998 | Haeger | Apr. 6, 1943 |
| 2,559,707 | Burke et al. | July 10, 1951 |